3,824,154
EVAPORATING METHOD AND APPARATUS
Masaharu Takada, Toyonaka, Koichi Yamada, Nishinomiya, and Kozo Hamahata, Takarazuka, Japan, assignors to Sasakura Engineering Co., Ltd., Osaka, Japan
Filed July 6, 1971, Ser. No. 159,831
Claims priority, application Japan, July 8, 1970, 45/60,049
Int. Cl. B01d 1/26, 3/02
U.S. Cl. 202—174           8 Claims

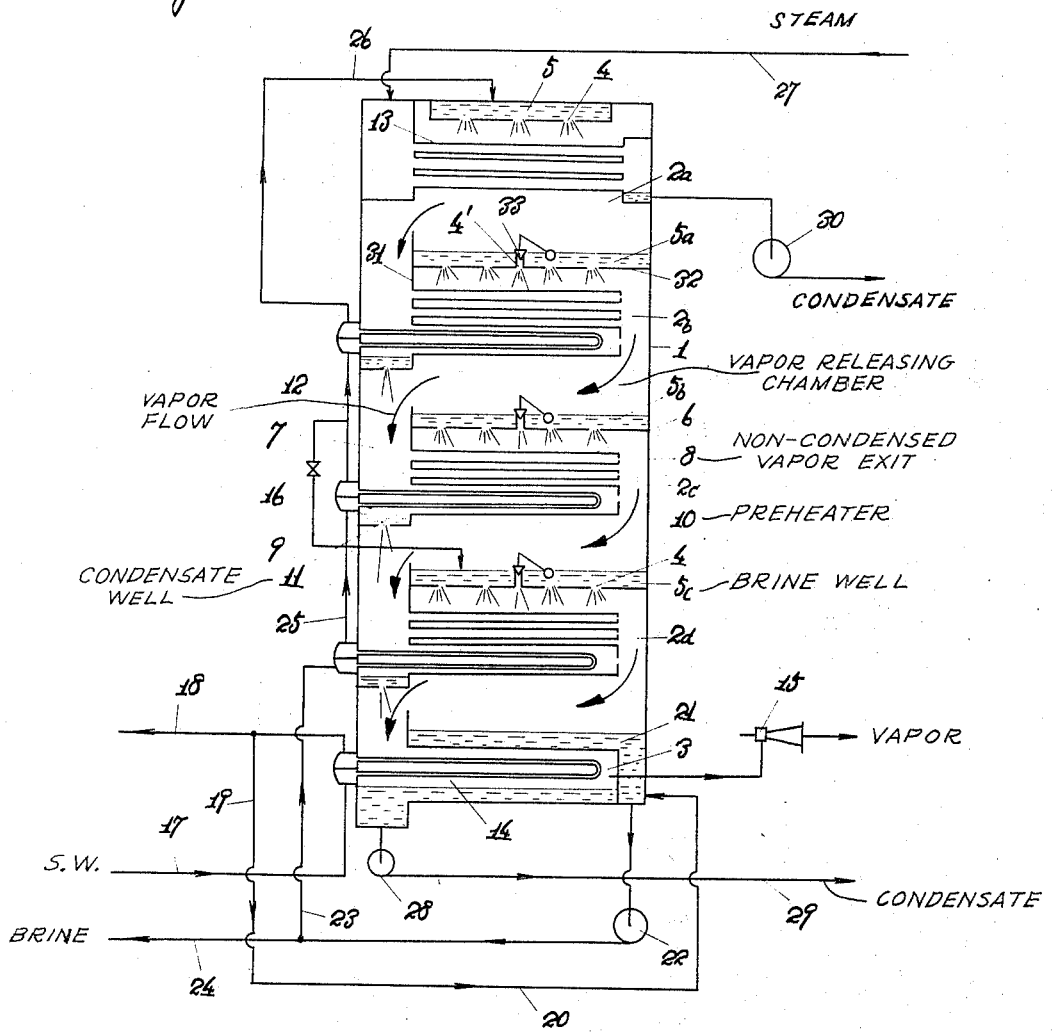
Fig. 1
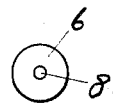
Fig. 2 Fig. 3

ABSTRACT OF THE DISCLOSURE

An evaporating system, characterized in that a shell is sectioned with substantially horizontal partition walls, with a plurality of effective units which operate under different pressures are arranged in the vertical direction in the order of pressure, with the unit of higher pressure located upwardly. Brine remained in the bottom of an upper effective unit is spread over the next effective unit of lower pressure from jet holes provided at the partition wall by the head of the brine and pressure difference between the two effective units. A part of the brine is flash-evaporated and the remainder is distributed to the outer surface of a heat transfer tube in the effective unit of lower pressure. The brine is heated by steam generated in the upper effective unit and is partly condensed.

BACKGROUND OF THE INVENTION

This invention relates to an improved evaporating method and an improved evaporating apparatus.

As is generally known, the improvement of heat economy is an important factor in efficiently obtaining pure water by evaporating salt water, such as sea water. In this case, heat economy means a ratio of the quantity of pure water obtained to the quantity of heat supplied. In order to improve the heat economy, a multiple effect evaporating method, in which many effective units connected with one another are employed, has been adopted so far, especially for evaporating brine. A multiple effect evaporating method of the so-called long tube vertical (LTV) type of evaporator, in which long heat transfer tubes are arranged in vertical direction, has been recommended. Under this multiple effect evaporating method, it is usual that the brine which flows down along the inner wall of a vertical heat transfer tube is evaporated and the steam generated at the surface of the preceding effective unit is introduced as a heating source and is condensed. According to this method, however, it is difficult to make the brine flow down uniformly along the inner surface of the heat transfer tube and accordingly scale formation and poor heat transfer are caused by irregular flow of the brine. Moreover, for each effective unit, brine must be pumped up above the long heat transfer tube for circulation, for which many pumps and much power are required. Furthermore, since effective units are connected with one another in a lateral direction, the connection of effective units and piping are complicated and a large area is required for installation thereof.

In order to eliminate scale formation and poor heat transfer due to irregular flow of the brine, a method has been designed, for example, whereby evaporating tubes are placed sideways and at each effective unit, brine from a spray nozzle is spread over the surface of a heat transfer tube. Under this method, however, the brine is spread over the spray nozzle in liquid condition and therefore, even if many special nozzles are provided, it is still difficult to distribute the brine uniformly onto the surface of the heat transfer tubes, and it is necessary to equip each effective unit with a pump to pump the brine above the heat transfer tube. Thus, this method is complicated with respect to the composition of the apparatus, piping and operation, and requires a large floor area for installation of the apparatus.

OBJECT OF THE INVENTION

The present invention has as its object the elimination of the many demerits of the conventional multiple effect evaporating method as mentioned hereinbefore, and the provision of a novel method of evaporating, which is high in heat economy and has many advantages to be mentioned hereinafter.

BRIEF DESCRIPTION OF THE DRAWINGS

The nature and advantages of the present invention will be understood more clearly from the following description made with reference to the accompanying drawings, in which:

FIG. 1 is a diagram of the longitudinal sectional view of the apparatus according to the present invention.

FIG. 2 is a cross sectional view of the heat transfer tube.

FIG. 3 is a side elevation of the heat transfer tube shown in FIG. 2.

DETAILED DESCRIPTION OF THE INVENTION

The present invention is not limited to the following description and the accompanying drawings but its technical scope is as defined in the claims to be made hereinafter.

In the drawings, numeral 1 denotes the main body of a multiple effect evaporator having effective units 2a, 2b, 2c and 2d positioned vertically in the order given, with a partition wall 32 between adjacent effective units, and a condenser 3 at the underside of the lowermost effective unit 2d. Many brine jet holes 4 are provided at the partition wall 32 between adjacent effective units and communicate with an effective unit located thereabove. Brine jet holes 4 at the uppermost effective unit 2a communicate with a brine well 5. These jet holes may be provided at a tubular body or a box-shaped body communicating with the brine well at the surface of the partition wall 32. For each effective unit, excepting the uppermost one 2a, a heat transfer tube bundle having a plurality of heat transfer tube 6 which are substantially horizontal is fixed to a tube plate 31 and the outside space of each heat transfer tube 6 communicates with the inside of a heat transfer tube of the succeeding effective unit of lower pressure, through a steam passage 7.

Provided at an end portion of each heat transfer tube is an ejecting hole 8, through which non-condensable gas deposited in the heat transfer tube 6 is sent to the succeeding effective unit. A preheating chamber 10 having a preheating tube 9 and an ejecting hole 8 is provided below the heat transfer tube bundle and is opened to the steam passage 7. A distilled water well 11 is formed at the steam passage of each effective unit and at the bottom thereof is made a jet hole 12, thereby communicating with the steam passage of the succeeding lower effective unit. Provided at a part of the afore-mentioned jet holes 4 is a liquid level regulator 33 using a float or the like.

The uppermost effective unit is provided with a heating tube 13 using a heat source supplied from the outside. The condenser 3 provided below the lowermost effective unit 2d carries a cooling tube 14 therein. A steam ejector 15 is connected to the condenser 3 so as to maintain the pressure in each effective unit at successively lower pressure in the order from the upper unit to the lower unit.

Numeral 16 denotes a withdrawal pipe which, for example, draws out a part of the circulating brine and mixes it with brine in the effective unit 2c at an intermediate location in the system. In the accompanying drawings, the heat transfer tubes 6 and the preheating tube 9 are placed horizontally but they may be somewhat slanted. Also, the partition wall 32 may be slantingly positioned. At any rate, they may be placed as desired, so long as they are substantially horizontal.

Seat water, for example, introduced from a pipe 17, while it is passing in a cooling tube 14, cools and condenses the steam generated in the effective unit 2d and is then discharged through an exhaust pipe 18.

The exhaust pipe 18 carries a branch pipe 19, through which a part of exhausted brine is fed to a brine well 21 of the effective unit 2d of lowest pressure as feed water, by way of a pipe 20, and is mixed with the brine therein. This brine mixed with saline water is drawn out of the brine well 21 by a pump 22, and a part of it is sent under pressure into the preheating tube 9 in the effective unit 2d of lowest pressure, for example, while the remainder is exhausted out of the stytem by an exhaust pipe 24.

In order to prevent scaling of the heat transfer tube, heating tube, etc., injection of scale inhibitor, deaeration, etc. should be carried out where necessary, as in the case of the conventional saline water evaporating method.

At the preheating tube 9 in the effective unit 2d, brine is preheated by heat-exchanging with steam generated at the upper adjacent effective unit 2c and introduced through the steam passage 7. After similar pre-heating is repeated at the upper effective units by way of a rising pipe 25 which connects one effective unit to the other, the brine is sent to the effective unit 2a of highest pressure via a pipe 26 and is spread and distrbuted over the surface of the heating tube 13 from the jet holes 4 of the brine well 5. On the other hand, heated steam, for example, is introduced into the heating pipe 13 from the outside by a pipe 27 and heats the brine spread from the jets holes 4, a part of which is evaporated and thus generated steam is fed to the heat transfer tube 6 and the preheating chamber 10 of the succeeding effective unit 2b of lower pressure, by way of the steam passage 7.

The unevaporated brine which remains in a brine well 5a provided at the bottom of the effective unit 2a is passed into the effective unit 2b through the jet holes 4 by the pressure difference between effective unit 2a and effective unit 2b and also by the head of the brine. A part of this brine causes flash evaporation and generates steam due to the pressure differences between adjacent effective units and at the same time disperses the brine. This brine is distributed uniformly at the outer surface of the heat transfer tube 6 and heat-exchanges with steam generated in the effective unit of higher pressure, and the steam introduced into the last transfer tube 6, therein condenses. The brine is heated by such steam and is vaporized at the outer surface of the tube, and thus steam is generated. Unevaporated brine remains in the brine well 5b. The same operation is repeated at the effective unit 2c and the effective unit 2d of successively lower pressure.

Brine levels at brine wells 5a, 5b and 5c are always kept constant for a stable operation, even if the brine flow rate or the pressure difference between effective units fluctuates, by a regulator 33 provided at a portion of the jet holes 4.

It is clear that if the brine flow rate increases, the flow from the jet hole 4 increases by the operation of the regulator 33. On the other hand, if the brine flow rate decreases, the flow from the jet hole 4 decreases or stops. However, even in such cases, brine flow from the many jet holes as a whole is constant, causes flash evaporation, is dispersed in a wide range and is distributed uniformly on the surface of the heat transfer tube located below. Therefore, even if the flow from some of the many jet holes 4 has decreased or stopped, there is no danger of poor heat transfer and formation of scale due to unequal distribution of brine.

The brine which reaches a brine well 21 of the effective unit 2d having the lowest pressure is mixed with feed sea water and is with-drawn under pressure by the pump for circulation, while a part thereof is exhausted.

Steam generated in the effective unit 2a is fed into the heat transfer tube 6 of the effective unit 2b and also into the preheating chamber 10, via the steam passage 7. In the heat transfer tube 6, while the steam evaporates brine at the outer surface, it condenses itself in the inner surface and turns into distilled water. On the other hand, in the preheating chamber 10 the steam heat-exchanges with circulating brine and is condensed into distilled water and the brine rises in its temperature. Both of these quantities of distilled water settle in the distilled water well 11 provided at the steam passage 7.

As the distilled water well 11 is provided with a jet hole 12, distilled water spreads over the steam passage 7 connecting with the effective unit 2c located below and causes flash evaporation and generates steam. This steam mixes with steam generated in the effective units 2b and reaches the heat transfer tube 6 and the preheating chamber 10 of the effective unit 2c, where the same operation as mentioned above is effected. The jet hole 12 is also provided with a liquid level regulator such as in the brine jet hole 4 to keep the liquid level constant. Thus, distilled water repeats flash evaporation and successively moves to the effective units of lower pressure, and is removed by a distilled water pump 28 via a pipe 29, together with distilled water which was cooled and condensed with cooling sea water in the condenser 3. Steam used for the heating tube 13 of the effective unit 2a of highest pressure is condensed after it heats the brine, and the resultant distilled water is removed by a pump 30. In place of the heating tube 13 in the effective unit 2a of highest pressure, a heater using a heat source other than steam can safely be used.

The total of the quantity of concentrated brine to be exhausted out of the system from exhaust pipe 24 and the quantity of evaporation in the system (or the quantity of distilled water to be taken out of pipe 29) becomes the amount of feed water to be introduced from the pipe 17 via the pipe 20 and is mixed with brine for circulation in the system.

However, as occassion demands, it is possible to exhaust the total brine from the exhaust pipe 24, without circulating it, and introduce fresh sea water alone into the effective unit of highest pressure via the preheater.

The foregoing explanation was made with the use of four effective units, but the number of effective units may be determined as desired. In the case where many effective units are used, the quantity of brine which flows down decreases gradually as the brine reaches the lower effective units. This may involve difficulties in uniformly distributing the brine from the jet holes 4 to the outer surface of the heat transfer tube 6 and also can cause formation of scale. In such a case, it is recommended to mix the brine from the withdrawal pipe 16 provided at the rising pipe 25 through which circulating brine passes, with the brine settled in the brine well 5c of the effective unit 2c located intermediately in the system, so as to prevent shortage of brine therein.

Since the primary effect of the present invention is to jet brine into effective units of successively lower pressure by the pressure difference between upper and lower effective units and the head of the brine and to cause flash evaporation, the brine is made minute by such flash evaporation and is distributed uniformly on the outer surface of the horizontal heat transfer tube. Therefore, the system of the present invention is entirely free from irregular flow of brine which can cause formation of scale and poor heat transfer. The second effect of the present invention is the circulation of the brine in the effective unit of the lowest pressure into effective unit of the highest pressure by only one pump. As compared with the conventional method in which at least one pump is provided for each effective unit, this method requires fewer pumps and as a result, less power consumption for pumping. The third effect of the present invention is simpleness of outer piping and the requirement of less installation area because of the vertical arrangement.

Under the method according to the present invention, in which a part of the brine is re-circulated in the system, brine is circulated from effective unit of the lowest pressure to that of highest pressure, and the quantity of brine recirculated can be so chosen as to enable the evaporating apparatus to work most efficiently. Therefore, the operation of the apparatus can be maintained stable and irrespective of the quantity of brine recirculated, feed water in the quantity corresponding to the quantity of exhaust brine and the quantity of evaporation in the system need only be mixed with the recirculated brine and the quantity of feed water to be introduced therefore can be kept small. Accordingly, the quantity of acid to be injected for the purpose of preventing scale formation can be reduced to a large extent and the quantities of dissolved oxygen and carbon dioxide to be introduced into the system are also small, with the result of less corrosion of the inner surface of the apparatus. Moreover, the resultant smaller amount of non-condensable gas produces the effect of improving the coefficient of heat transfer. Furthermore, as the liquid levels of brine and distilled water are regulated by the liquid level regulator 33 having a float, evaporation is effected uniformly at all times and stabilized operation can be continued.

Under the method according to the present invention, in which recirculating brine is supplied to the brine in the intermediate effective unit, it is unnecessary to circulate all the quantity of brine from the effective unit of lowest pressure to that of highest pressure, but the quantity corresponding to the brine which has been lost due to evaporation is supplied to the intermediate effective unit through a branch of the circulation passage, and thus the brine flow rate throughout all of the effective units can be kept almost uniform. Therefore, distribution of brine can be kept more uniform and at the same time, power requirements for pumping can be reduced.

The present invention having such advantages as mentioned above can be applied not only to the evaporation of saline water such as sea water, but also to concentration of various solutions and regeneration of waste water.

What is claimed is:

1. A process for evaporating and distilling liquids such as brine, or sea water, comprising:
    (A) providing a plurality of effective units operable at differing pressures vertically one on top of the other, with units of higher pressure positioned succeedingly higher; the uppermost of said effective units having a heating tube supplied by an external heating source and an upper brine well having jet holes therein; the lowermost effective unit having a brine well and a condenser with a cooling tube; there being substantially horizontal partition walls separating adjacent effective units, each of said partition walls forming a brine well and having a plurality of jet holes therein; each of said effective units other than the uppermost thereof having a horizontal heat transfer tube bundle including at least one heat transfer tube positioned below said jet holes of the next upper of said partition walls to be impinged by liquid through said holes, and a preheating chamber below said bundle with a preheating tube therein; each of said effective units other than said lowermost effective unit, having a vapor releasing chamber communicating both with the interiors of the heat transfer tubes of the heat transfer tube bundle and with the preheating chamber of the succeeding effective unit; said lowermost effective unit having a vapor releasing chamber surrounding said condenser which comprises an initial preheater tube;
    (B) pumping by means of a single pump said liquid successively through said preheating tubes of said effective units in the order of the lowermost thereof to the uppermost thereof;
    (C) pumping by means of said pump said liquid from the uppermost of said preheating tubes into said upper brine well of said uppermost effective unit;
    (D) passing said liquid through said jet holes in said upper brine well, allowing said liquid to contact the outer surface of said heating tube, thereby evaporating a portion of said liquid to form vapor;
    (E) collecting the remaining portion of said liquid in the brine well formed by the uppermost of said partition walls;
    (F) passing all of said collected liquid through said jet holes in said last mentioned brine well to uniformly contact the exteriors of the heat transfer tubes of said heat transfer bundle in the next lower effective unit and to thereby flash evaporate said collected liquid to form additional vapor;
    (G) passing a portion of said vapor formed in step (D) through said vapor releasing chamber of said uppermost effective unit into said preheating chamber of said next lower effective unit, thereby heating said liquid passing through said corresponding preheating tube, while condensing said vapor to form distilled water, and then collecting said distilled water in a distilled water well;
    (H) passing the remainder of said vapor formed in step (D) from said uppermost effective unit into the interior of the heat transfer tubes of said heat transfer bundle of said next lower effective unit, thereby heating and evaporating a portion of said liquid contacting the exterior thereof to form vapor in said next lower effective unit;
    (I) passing said collected distilled water from step (G) through an orifice into the vapor releasing chamber of said next lower effective unit to thereby flash evaporate said distilled water and form said additional vapor in said next lower effective unit;
    (J) repeating said steps (E) through (I) in each of said succeedingly lower effective units;
    (K) collecting the unevaporated portion of said liquid from said lowermost effective unit in said brine well thereof;
    (L) passing the vapor from said vapor releasing chamber of said lowermost effective unit into said condenser, thereby condensing said vapor by said cooling tube and forming distilled water; and
    (M) collecting said distilled water from said condenser.

2. A process as claimed in claim 1, further comprising removing a portion of said liquid intermediate its passage through said preheating tubes, and supplying said removed portion of liquid to the brine well of one of the lower intermediate of said effective units.

3. A process as claimed in claim 1, wherein said cooling tube is cooled by passing a fresh supply of said liquid therethrough.

4. A process as claimed in claim 3, further comprising adding a portion of said fresh supply of liquid, after passage through said cooling tube, to said liquid collected in said brine well of said lower most effective unit, and wherein said liquid successively pumped through said preheating tubes is the mixture of said fresh supply of liquid and said collected liquid from said brine well of said lowermost effective unit.

5. An apparatus for evaporating and distilling liquids, such as brine or sea water, comprising;
    a plurality of effective units operable at differing pressures positioned vertically one on top of the other, with units of higher pressure positioned succeedingly higher;
    the uppermost of said effective units having a heating tube supplied by an external heating source, and an upper brine well having jet holes therein positioned above said heating tube to spray liquid onto said heating tube;
    each of said effective units, other than said uppermost effective unit, having a substantially horizontally positioned heat transfer tube bundle including at least one heat transfer tube, and a substantially horizontally positioned preheating chamber with a preheating tube therein, and a distilled water well;

the lowermost of said effective units further having a brine well, and a condensing chamber with a cooling tube therein which comprises an initial preheater tube;

intermediate walls positioned between adjacent of said effective units and forming brine wells, each of said intermediate walls having therein jet hole means for spraying all liquid collected in said corresponding brine well onto the exterior of the heat transfer tubes of the heat transfer tube bundle of the succeedingly lower effective unit thus flash evaporating said liquid;

each of said effective units, other than said lowermost effective unit, having vapor releasing chamber means communicating both with the interior of the heat transfer tubes of the heat transfer tube bundle and with the preheating chamber of the succeedingly lower effective unit;

said lowermost effective unit having vapor releasing chamber means communicating with said condensing chamber;

single pump means for pumping said liquid successively through said preheating tubes, in the order of the lowermost thereof to the uppermost thereof, and for pumping said liquid from said uppermost preheating tube into said upper brine well of said uppermost effective unit; and each of said distilled water wells of said preheating chambers having therein orifice means for spraying distilled water collected therein into said corresponding vapor releasing chamber to cause flash evaporation of said distilled water.

6. An apparatus as claimed in claim 5, further comprising by-pass means for removing a portion of said liquid intermediate its passage through said preheating tubes, and for supplying said removed portion of liquid to the brine well of one of the lower intermediate of said effective units.

7. An apparatus as claimed in claim 5, further comprising means for passing a fresh supply of said liquid through said cooling tube.

8. An apparatus as claimed in claim 7, further comprising means for adding a portion of said fresh supply of liquid, after passage through said cooling tube, to liquid collected in said brine well of said lowermost of said effective units, said single pump means being operative to pump at least a portion of the mixture of said fresh supply of liquid and said collected liquid from said brine well of said lowermost effective unit through said preheating tubes.

References Cited

UNITED STATES PATENTS

| | | | |
|---|---|---|---|
| 3,245,460 | 4/1966 | Loebel | 159—17 P X |
| 3,303,106 | 2/1967 | Standiford, Jr. | 159—18 |
| 3,304,242 | 2/1967 | Lockman | 159—18 |
| 3,351,120 | 11/1967 | Goeldner et al. | 159—13 B |
| 3,481,835 | 12/1969 | Carnavos | 159—18 X |
| 3,532,152 | 10/1970 | Cartinhour | 202—175 |

FOREIGN PATENTS

| | | | |
|---|---|---|---|
| 74,691 | 12/1960 | France | 159—18 |
| | (1st add to 1,178,135) | | |

JACK SOFER, Primary Examiner

U.S. Cl. X.R.

159—18, Dig. 8